(12) United States Patent
Eason et al.

(10) Patent No.: US 6,874,008 B1
(45) Date of Patent: Mar. 29, 2005

(54) WORKFLOW ENCAPSULATION IN STATELESS ENVIRONMENTS

(75) Inventors: William L. Eason, Austin, TX (US); Carolyn Faour, Austin, TX (US); David Harvey, Cedar Park, TX (US); Neil Dholakia, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 662 days.

(21) Appl. No.: 09/686,731

(22) Filed: Oct. 10, 2000

Related U.S. Application Data

(60) Provisional application No. 60/158,731, filed on Oct. 11, 1999.

(51) Int. Cl.$^7$ .............................................. G06F 15/16
(52) U.S. Cl. ...................................... 709/201; 345/765
(58) Field of Search ............................... 709/201, 217, 709/219, 204, 205, 328, 310; 345/765, 619, 764; 717/100, 103

(56) References Cited

U.S. PATENT DOCUMENTS

| | | | | |
|---|---|---|---|---|
| 5,390,330 A | | 2/1995 | Talaki ......................... | 395/700 |
| 5,734,837 A | * | 3/1998 | Flores et al. .................... | 705/7 |
| 6,067,548 A | * | 5/2000 | Cheng .................... | 707/103 R |
| 6,158,044 A | * | 12/2000 | Tibbetts ....................... | 717/100 |
| 6,205,575 B1 | * | 3/2001 | Sherman et al. ............ | 717/100 |
| 6,453,356 B1 | * | 9/2002 | Sheard et al. ............... | 709/231 |
| 6,549,956 B1 | * | 4/2003 | Bass et al. .................. | 709/328 |
| 6,562,076 B2 | * | 5/2003 | Edwards et al. ............ | 715/515 |
| 6,606,740 B1 | * | 8/2003 | Lynn et al. .................. | 717/100 |
| 6,621,505 B1 | * | 9/2003 | Beauchamp et al. ........ | 345/764 |
| 6,636,242 B2 | * | 10/2003 | Bowman-Amuah ......... | 345/764 |

FOREIGN PATENT DOCUMENTS

| | | | |
|---|---|---|---|
| EP | 0798634 A1 | 10/1997 | ............. G06F/9/44 |

OTHER PUBLICATIONS

Charles Payne, Dan Thomsen, Jessica Bogle, and Richard O'Brien, "NAPOLEON: A Recipe for Workflow", Secure Computing Corp., Annual Computer Security Applications Conference Papers, Dec. 1999.*

M. Hardwick, et al., "Rose and Chide: user interface management system implementation as object–oriented database system application," XP000159075, computer–aided design, vol. 22, No. 8, 9 pages, Oct. 1990.

J. Burgstaller, et al., "On the Software Structure of User Interface Management Systems," XP000132218, European Computer Graphics Conference and Exhibition, Hamburg, F.R.G. 12 pages, Sep. 4–8, 1989.

Philip J. Hayes, et al, "Design Alternatives for User Interface Management Systems Based on Experience with Cousin," XP–002171176, CHI '85 Proceedings, 7 pages, Apr. 1985.

Notification of Transmittal of the International Search Report of the Declaration, 7 pages, Jul. 17, 2001.

* cited by examiner

*Primary Examiner*—Marc D. Thompson
(74) *Attorney, Agent, or Firm*—Baker Botts L.L.P.

(57) ABSTRACT

A system for running applications such as may be used over the internet separates the logical workflow processes of the application from views presented to a user. Separate process flow modules are used to provide state code for executing transactional applications. Logical views are designated by these modules in response to user input. Actual views presented to a user are derived from these logical views according to the status of the user and the communication channel over which the transaction is being performed. Process flow modules can be reused with different sets of user interface views to provide a variety of user interfaces without significant recoding.

20 Claims, 2 Drawing Sheets

WORKFLOW ENCAPSULATION IN STATELESS ENVIRONMENTS

CROSS-REFERENCE TO RELATED APPLICATION

This application claims priority based upon Provisional Application Filing No. 60/158,731 filed Oct. 11, 1999 titled ARCHITECTURE FOR CHANNEL-INDEPENDENT ENCAPSULATION OF WORKFLOW IN STATELESS ENVIRONMENTS.

BACKGROUND OF THE INVENTION

1. Field of the invention

The present invention relates generally to distributed computer systems, and more specifically to a system for processing user requests, which separates process state from presentation.

2. Description of the Prior Art

The rising popularity of computer communication systems such as the internet has given rise to new techniques for performing business transactions. It is not uncommon for several applications to carry on an interactive dialogue with multiple simultaneous users to perform many types of business transactions.

Internet based applications for performing business transactions generally include a number of pages which are presented to a remote user in some logical sequence. Each page has information which is presented to the user, and includes some type of input technique by which the user can enter information and make selections. Each page typically contains associated code which determines whether the user's input is valid, and determines which page comes next.

This approach to preparing internet-based applications is both demanding and somewhat limited. Application designers must be conversant with various aspects of web page design, as well as with the underlying business processes. Once an application has been completed, it may be copied and modified to be used again in the future, but is not very flexible. Significant modifications must be made to various details of the pages presented to the user. Entirely new application code must be written to adapt the application to a significantly different user interface, such as an audible interface to be used through the telephone as opposed to a visual interface to be used with a computer.

It would be desirable to provide a system and method for running such applications which was simultaneously more flexible and useful, and easier to program.

SUMMARY OF THE INVENTION

In accordance with the present invention, a system for running applications such as may be used over the internet separates the logical workflow processes of the application from views presented to a user. Separate process flow modules are used to provide state code for executing transactional applications. Logical views are designated by these modules in response to user input. Actual views presented to a user are derived from these logical views according to the status of the user and the communication channel over which the transaction is being performed. Process flow modules can be reused with different sets of user interface views to provide a variety of user interfaces without significant recoding.

DESCRIPTION OF THE DRAWINGS

Additional objects, features and advantages will be apparent in the written description which follows.

DESCRIPTION OF THE PREFERRED EMBODIMENT

It will be appreciated by those skilled in the art that the architecture and system described herein can be implemented using any number of widely available software systems and tools. Although the following description is given with respect to an application for performing transactions over the internet, it will be appreciated by those skilled in the art that the techniques described herein may be used with a variety of transactional systems.

Figure 1:
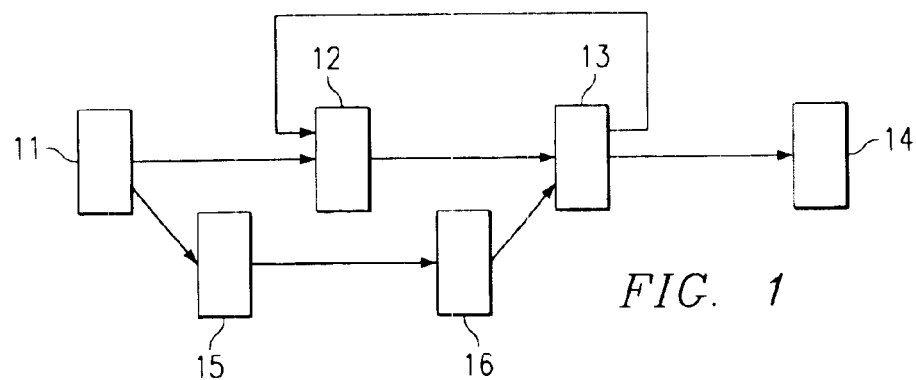
FIG. 1 is a block diagram of a series of interrelated web pages.

FIG. 1 represents a set of interconnected web pages for implementing a business transaction in an internet environment. Web pages 11–16 preferably each provide data and graphic information to a user. Each page 11–16 may contain responsive means, such as buttons, menus, or data entry fields for a user to enter information into the transaction. Once data is entered, flow of control passes to another page which presents additional information to the user.

For some pages, in this example 11 and 13, more than one next page may be selected depending upon the nature of the input received from the user. In fact, loops can be formed, such as illustrated by pages 12 and 13. This illustrates a hypothetical control flow in which a user may perform a number of actions while moving back and forth between pages. An example of such a control flow may be adding purchased items to a shopping cart until all designated items have been selected, followed by submitting a final order.

In prior art implementations, each page 11–16 must be programmed to contain all of the code for presenting its information to the user, and receiving input. In addition, the determination of flow of control between pages must be made at each page.

Figure 2:
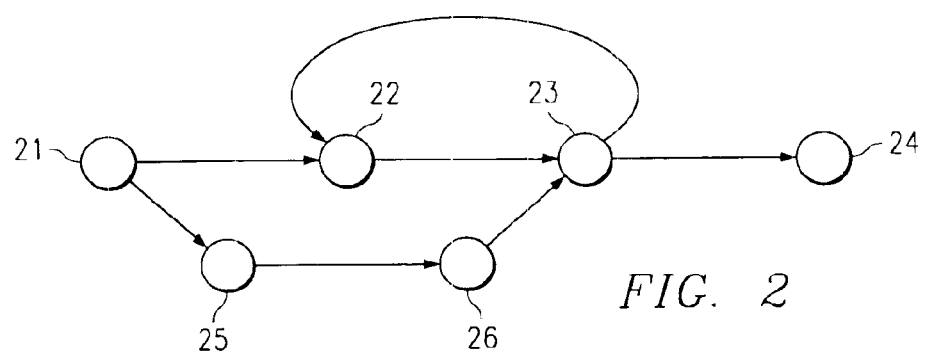
FIG. 2 is a state diagram of control steps corresponding to the diagram of FIG. 1.

In accordance with a preferred embodiment of the present invention, the control information used to traverse from page to page is extracted from the web pages and encapsulated into separate workflow modules, also referred to as process modules. FIG. 2 illustrates a workflow module corresponding to the web pages of FIG. 1. In FIG. 2, states 21–26 correspond to pages 11–16, respectively. FIG. 2 is a state diagram of a well-known type, in which decisions are made at each node, and control passed to a following node when an event is completed.

Within each node of the state diagram, an input or request from the user is received, processed and appropriate output generated. Control then passes to the next state which awaits the next input from the user. Because of the step-by-step nature of typical remote transactions performed over the internet, state diagrams such as that shown in FIG. 2 are extremely useful for embodying business transaction processes.

Conceptually, the process of interacting with the remote user is broken into two components. The first component is referred to herein as the workflow component, which contains the logical processes of an application for managing interactions between a user and the larger system. The workflow portion of an application is that portion which handles incoming requests from a user, and performs any underlying transactions. That is, the workflow portion of the application is that portion which directs the making of queries on an underlying database, enters transactions such as sales to the database, and similar functions.

The workflow portion of an application has three major responsibilities. First, it handles requests from a user, and manages the process of fulfilling those requests. As the user interacts with the user interface portion of the application, events are generated as described above. The workflow portion of the application interprets these events and, takes appropriate action in response.

Second, workflow modules embody the rules and constraints defining what actions are valid for a user to take at any given time. As described above, the workflow module functions as a state machine for the application. At any given state, only certain user responses are considered valid. The workflow module determines whether a user request is valid, and proceeds to the next state if it is. If an incoming request is not valid, the workflow module manages the error handling process.

Third, the workflow module is responsible for directing the course of interactions with the user. After processing a request, the workflow module determines the appropriate response and causes an appropriate presentation to be made to the user's interface. The workflow module generates logical views of the information to be presented to the users, which is converted to a physical view to be presented to the user.

The presentation portion of the application consists of a number of views, roughly corresponding to web pages in most applications, which contain the information to be presented to each user. The job of the workflow module is to identify the next view to be presented, and provide information which must be used to provide data within that view. The presentation portion of the application handles the task of formatting the view appropriately to be presented to the user, and all other details of the user interface itself. Thus, the presentation of information to the user is separated from the logical flow of the underlying business process. As described below, this provides a great flexibility for web-based applications.

Figure 3:
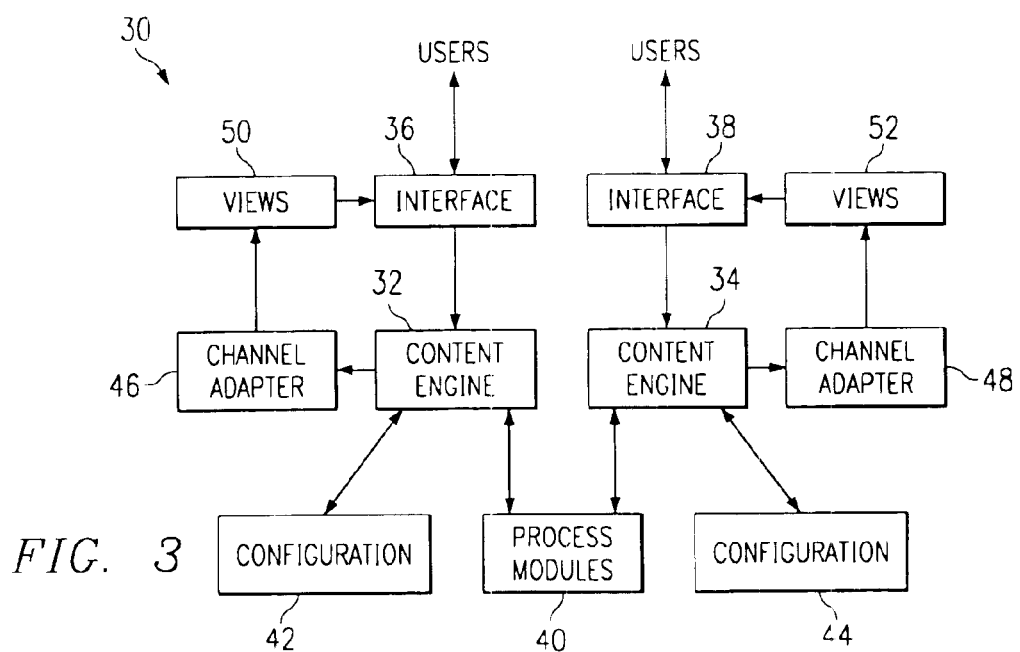
FIG. 3 is a block diagram illustrating a preferred system architecture in accordance with the present invention.

Referring to FIG. 3, a system for executing applications to interface with remote users is designated generally with reference number 30. Content engines 32, 34 are connected to interfaces 36, 38 respectively. Both content engines 32, 34 are connected to a single set of process modules 40. Each content engine is connected to configuration data 42, 44, and to a channel adapter 46, 48. Each channel adapter 46, 48 is connected to a set of views 50, 52 respectively. Views 50, 52 are also connected to interfaces 36, 38 respectively.

Two content engines 32, 34 are illustrated to show the value of the present approach in dealing with different types of user interfaces. Interface 36 can be, for example, a web based server which communicates with remote users over the internet in a known fashion. Interface 38 can be a completely separate type of interface, such as an audio interface intended to be used over the telephone. Although user interfaces for an internet based computer and a telephone present completely different interfaces to an end user, they can both be used to implement the same kind of underlying business transaction. The present invention allows a single business transaction to be defined which can be used successfully with radically different types of interfaces.

The content engine 32 functions as a central manager and router for all requests received from a remote user. Requests are communicated from remote users to interface 36, which passes them along to content engine 32. Content engine 32 determines which process module should handle the request, and routes the request to that process module for processing. When a response is received from the process module, it is fed back to the user through channel adapter 46, views 50, and interface 36.

The content engine 32 provides various services to the process modules it manages. First, it controls the lifetime of a process module. As the user makes requests of the system, the content engine analyzes those requests. It determines whether the request should be handled by an existing instance of a process module or whether this request should be directed to a new process module instance instead. If the request is targeted towards a new instance, the content engine 32 creates that instance and initializes it with configuration information. The content engine 32 then manages references to that process module instance so that subsequent requests can be directed to it.

Another service of the content engine 32 is that it decouples the underlying process module from the channel the request is coming through and the physical views that are presented to the user. It would have been possible to have each process module know about and handle the processing of web requests and direct the user to specific web pages as a result. The problem with this approach is two-fold. First it makes the process module usable only in a web context minimizing the reusability of that workflow. Second it directly couples the process module to a specific implementation of the presentation (in this case the web pages). Thus while the workflow and presentation are separated they are still tightly coupled to each other.

Instead, in the preferred embodiment, the content engine 32 insulates the underlying process modules 40 both in the incoming and outgoing directions. Incoming it presents a generic (channel-independent) request to the process module. This allows different content engines to be developed for different channels, and have them re-use the same library of process module workflows without modification as shown in FIG. 3. This is advantageous as there are far fewer different channels for presentation than there are workflows to be managed. In the outgoing direction, all interactions with the presentation layer are managed by the content engine 32 through channel adapters 46 instead of directly by the process module 40. The process module 40 specifies logically what view should be presented and provides any data that it should contain, but it is the job of the content engine 32 to determine a physical instance of that logical view to present. Thus the process module is decoupled from the physical views. This makes it possible to develop views in multiple different authoring environments and re-use workflow across multiple channels. Significantly it also allows for personalization of presentation.

Personalization of presentation is another service provided by the content engine 32. The process module 40 logically specifies the view to be presented. The content engine 32 takes this logical designator and resolves it to a physical implementation of the view. During this resolution process, business owner defined rules may be evaluated to determine the specific physical instance. These rules can be based on user profile and channel characteristics, allowing a business owner to target views towards profile groups. Thus the process module 40 may specify that a product description is to be displayed back to the user. The content engine 32 then applies its rules to determines that the physical presentation should be a product description web page that is, for example, Internet Explorer specific and is geared towards young high-tech professionals based on the characteristics of the user and the request.

Finally, the content engine 32 also allows for personalization of the workflow presented to the user. In the same way that the request for a view is really a logical request to which personalization rules can be applied, the request for a workflow is also a logical request. In this way business owners can target workflows towards specific profile groups to provide a richer and more efficient interactions for the user. For instance, two different versions of an order process could be present in the system. One is a very simple wizard-like approach geared towards inexperienced users, while the second is a more full featured and correspondingly more complicated workflow geared towards purchasing agents and other more savvy users. The content engine can apply personalization rules that look at the profile characteristics of the user to decide which workflow is appropriate for that user. Rather than a one-size fits all approach, the interactions between the user and the application are tailored to that users capabilities and preferences.

The behavior of the content engine 32 is controlled by configuration data 42. This configuration data 42 specifies the mapping between logical and physical process modules, the mapping between logical and physical views, the personalization rules that control those mappings, and configuration parameters. The content engine 32 has no hard-coded knowledge of the process modules or views that it manages or the rules that are applied in resolving logical to physical mappings. This makes the content engine easily configurable and extensible to manage new views and workflows through a toolset rather than through recoding the application.

Process modules 40 embody the actual workflow. A process module instance is initiated by the content engine 32 to handle user requests. When the process module is first created the content engine 32 provides it with any configuration settings for that workflow. As it handles subsequent requests, the process module uses those configuration settings to determine certain aspects of its behavior.

A process module interprets the request from the user. Based on the current state of the system it determines whether the request is valid. In the case of an invalid request, the process module notifies the content engine 32 of the error condition. The content engine 32 then applies a policy (set through configuration data) for error handling for the particular process module and the current state. This error-handling policy can specify either a standard response (typically an error message presented to the user) or a specific view to be presented to the user which either more fully explains the error condition or allows the user to take some corrective action.

In the more typical case, where the request is valid, the process module handles the request. This handling of user requests typically involves retrieving data from the business logic layer, initiating transactions and updating the transient state of the system. The process module then decides what the appropriate response (view) is to show the user based on the new state of the system. This decision is communicated to the content engine 32, which performs the actual selection and manages the rendering of a physical view to be presented back to the user. In rendering the view, the current state data of the process module is made available to the view through a channel-independent mechanism.

The purpose of the channel adapter 46 is to provide an extensible mechanism whereby the content engine 32 can manage the presentation of content developed in multiple authoring environments. The content engine 32 resolves a logical view into a physical view. Based on the content type of the physical view, the content engine 32 then calls on a specific channel adapter 46 to resolve that view. It is the responsibility of the channel adapter 46 to provide the state data of the process module to the view in a channel-specific way and manage the rendering of that view.

Channel adapters 46, 48 thus allow views to be developed in any number of authoring environments. For instance web pages may be developed using ASP, JSP, XSL, Cold Fusion or other environments. It is then the responsibility of a channel adapter for that specific authoring environment to manage the creation of that web page which is then returned to the content engine.

Views 50 are the interface that is presented to the user. The process module 40 makes data available to the view 50 via the content engine 32 and channel adapter 46 as described above. The view 50 then formats and presents that data. This reduces the coding skills needed by a UI (user interface) designer. The UI designer only needs to be concerned with the formatting and presentation of data, deciding what fonts, colors and graphics to use and the layout of the page, and not with writing code to retrieve data and initiate actions.

Figure 4:
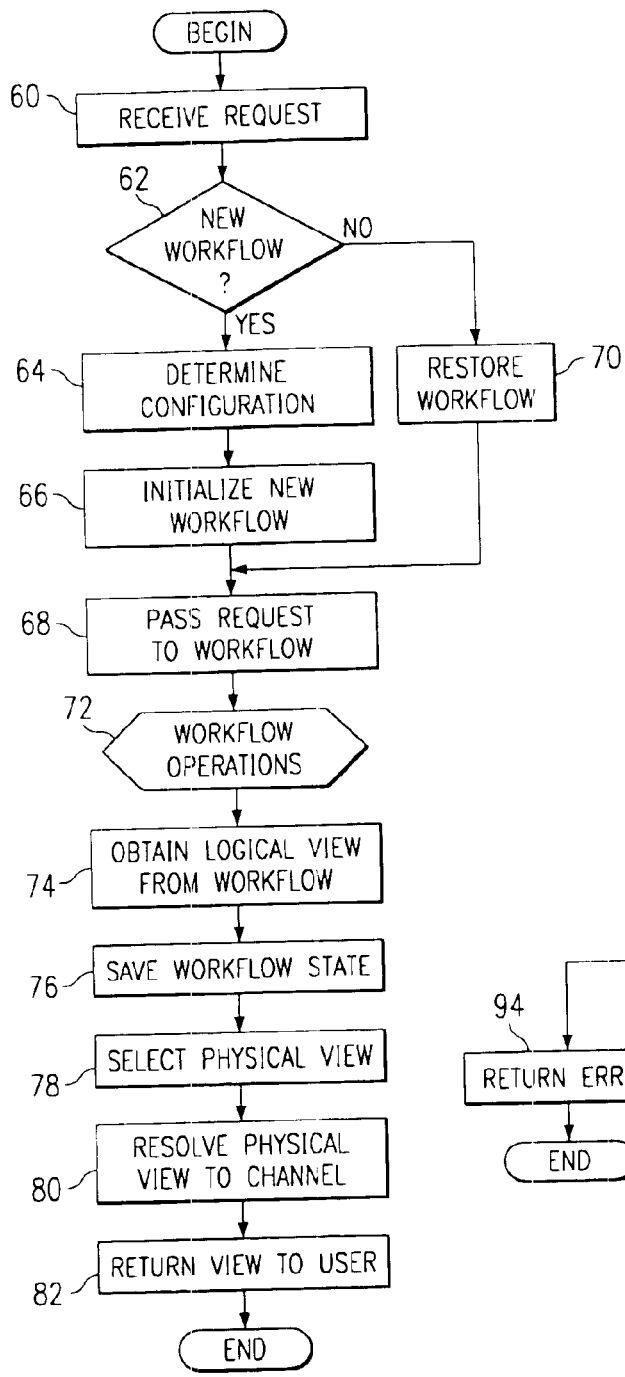
FIGS. 4 and 5 are flow charts showing operation of the system of FIG. 3.

The flow chart of FIG. 4 illustrates the processing steps, described above, undertaken by the system when the request is submitted by a user. When a user request is received 60, content engine 32 determines whether it is necessary to instantiate a new workflow 62. In an internet environment, a user request is correlated with a particular session. If an incoming request is part of an active session which has a workflow already in progress, a new workflow is not required. If a new workflow module is required, content engine 32 determines an appropriate configuration, and initializes a new workflow module 66. Preferably, the workflow modules are established in an object oriented environment, and simply initializing a new instance of the appropriate workflow module is enough. Step 54 includes a determination of which workflow module is to be invoked from among those available, as well as establishing parameters such as the expertise and the identify of the user which can affect which views are to be presented. Once the new workflow has been instantiated 66, the incoming request is passed to it 68.

If the incoming request is made with respect to an existing workflow module, that module is restored 70 and the request is passed to it 68. Between calls to a process module, the state of the module is saved to a temporary memory, sometimes referred to as "persisting its state". Between requests, the process module is not doing anything. It is reactivated from temporary storage only when a request is received, and will be returned to an inactive state after operations on that request are complete.

This restoration allows state information to be retained in what is essentially a stateless environment. By instigating a new workflow module for each session, all can operate independently and properly retain state.

After the request is passed to the workflow module, various workflow operations are performed 72. These operations will be detailed further in connection with FIG. 5. After the process module performs its workflow operation 72, a logical view to be presented to the user is returned 74. Along with the identification of the logical view is all data which is necessary to be returned to the user in response to the request just handled. This can be, for example, information such as confirmation of an order, pricing information and delivery schedules, and similar information which is presented to the user in the format set forth in the appropriate view.

After the logical view to be presented is obtained, the process module workflow state is saved 76, to remain quiescent until a next request is received. The content engine then selects a physical view 78 which corresponds to the logical view received from the process module. The physical view is resolved to the channel adapter 80, and a formatted view 50 is selected to be returned to the user 82.

Figure 5:
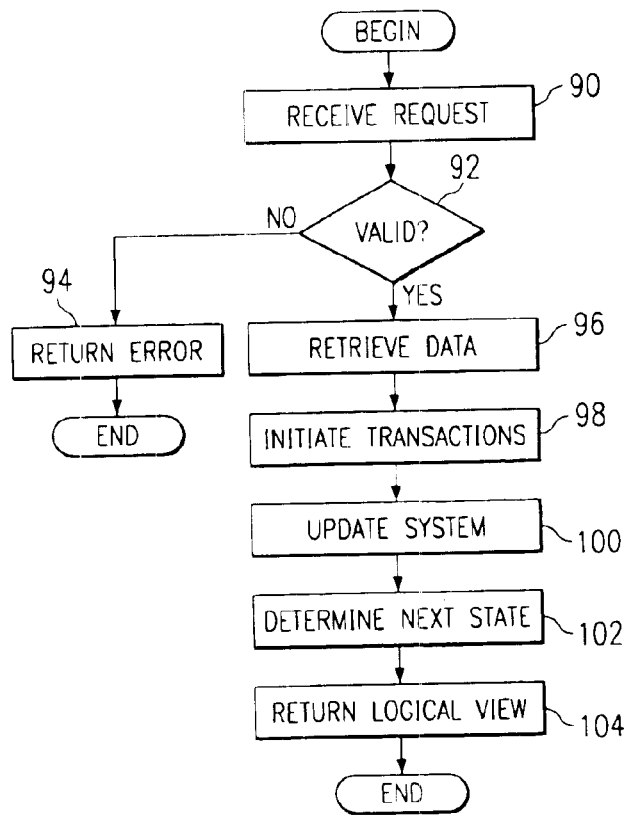

The flow chart of FIG. 5 illustrates the steps taken within the workflow operations Block 72 of FIG. 4. These steps are taken within the workflow module itself.

When a request is received 90, the process module determines whether the request is valid 92. Validity of a request depends upon both the current state of the process module and the user entered values included in the request. If the request is not valid, an error is returned 94 to content engine 32. Error handling may be handled in several different ways, including selection of an appropriate logical error view by content engine 32. Returning an error 94 is similar to returning a logical view, wherein the view returned is an error page.

If the incoming request is valid 92, the process module has several operations which it may undertake. The three steps shown in FIG. 5, retrieving data from the underlying business system 96, initiating transactions 98, and updating the underlying system 100, are typical actions undertaken by process modules. It may not be necessary to perform any or all of these steps in any particular state; the actual steps to be performed are application specific and determined by the current state of the process module and the user input.

The processes performed are made with the underlying business system. For example, goods can be ordered, data bases updated, and data retrieved to be presented to the user. All of these steps which occur are transparent to the user, with only the end result being returned. After all application logic steps 96–100 are performed, the process module determines the next state into which it should change 102, and returns an identification of a logical view to the content engine 104. Along with an identification of this logical view is all information necessary to be placed into the view for presentation to the user.

The above description has been with reference to content engine 32. The same process modules 40 used with content engine 32 can also be used with content engine 34 which delivers views into a different channel. The underlying process modules encapsulate the underlying business workflow, such as the process of taking and confirming an order. If that order is taken over a channel such as a telephone, limited to either voice recognition or entry of data using a telephone key pad, the presentations to an end user are significantly different than the graphically oriented views presented to a user over an internet connection. However, the underlying information processed by the process modules 40 and the logical view returned by them, can be exactly the same.

A different channel adapter 48 and different set of views 52 are provided for such different channels. This allows the same process modules, and in actuality nearly identical versions of the content engines, 32, 34, to support widely different communication channels. By simply providing different interface views, which may be somewhat of a misnomer in the case of a telephone interface, the same underlying business processes can be used for widely different interface channels.

The described system provides a number of advantages over prior art systems. The described modularity means that different implementers can be used for process modules and presentation views. Once a process module has been prepared for a particular application, it can be quickly and easily adapted to new communication channels which may come into existence or which are newly supported by the owner of the application. The implementers who write process modules need not be experts at techniques for presenting information to users, and user interface programmers need not be experts at performing the underlying business processes. This not only simplifies preparation of an application in the first place, but simplifies its maintenance by breaking problems into smaller, conceptually logical parts.

While the invention has been shown in only one of its forms, it is not thus limited but is susceptible to various changes and modifications without departing from the spirit thereof.

What is claimed is:

1. A system for encapsulating a business process workflow, comprising:
   a controller in communication with a user interface, the controller operable to:
   receive a request from the user interface;
   identify a process module associated with the request; and
   route the request to the process module to invoke the process module; and
   the process module having a plurality of states, each state comprising logic defining a portion of a business process and comprising an identifier of a corresponding view to be presented to a user, the view identifier comprising a logical specification of the corresponding view to be presented the process module operable to:
   identify the state of the plurality of states corresponding to the request; and
   provide the view identifier corresponding to the identified state to the controller;
   the controller further operable to:
   receive the view identifier from the process module; and
   generate a view for the user that is based on the logical specification of the view in the view identifier and is compatible with the user interface.

2. The system of claim 1, wherein the controller comprises:
   a content engine connected to the interface for receiving user inputs and invoking the process module in response thereto, and for receiving the view identifier therefrom;
   a channel adapter connected to the content engine for receiving the view identifier from the content engine, and selecting a presentation to be generated for the user, and connected to the user interface for communicating the presentation to the user.

3. The system of claim 1, further comprising:
   a second controller in communication with a second user interface and with the process module, wherein the second controller translates user input from the second user interface and invokes the process module in response thereto, and wherein the second controller further receives the view identifier from the process module and generates a view for the user that is based on the logical specification of the view in the view identifier and is compatible with the second user interface.

4. A method for responding to a user request received over a channel, comprising the steps of:
  providing a controller in communication with a user interface;
  providing a process module having a plurality of states, each state comprising logic defining a portion of a business process and comprising an identifier of a corresponding view to be presented to a user, the view identifier comprising a logical specification of the corresponding view to be presented;
  receiving at the controller a request from the user interface;
  identifying at the controller the process module, the process module associated with the request;
  routing the request from the controller to the process module to invoke the process module;
  within the process module, changing a state thereof in response to the request and generating an identifier of a view corresponding to the state to be presented to the user;
  receiving at the controller the view identifier from the process module;
  selecting a view to be presented to the user that is based on the logical specification of the view in the view identifier and compatible with the channel; and
  sending the view to the user over the channel.

5. The method of claim 4, further comprising when changing state within the process module, accessing a business application software module to determine which view identifier to generate.

6. The method of claim 4, further comprising when changing state within the process module, accessing a database.

7. The method of claim 4, further comprising when changing state within the process module, modifying data in a database.

8. A method for communicating with a user of a computer system, comprising:
  receiving at a controller a request from a user interface, the controller in communication with the user interface;
  identifying at the controller a process module associated with the request;
  routing the request from the controller to the process module to invoke the process module;
  in response to the input, invoking the process module associated with a business process, the process module being invoked in one of a plurality of states, each state comprising logic defining a portion of the business process and comprising an identifier of a view to be presented to the user corresponding to the state, the view identifier comprising a logical specification of the corresponding view, the process module operable to provide the view identifier corresponding to the invoked state to the controller;
  receiving at the controller the view identifier from the process module; and
  generating at the controller the view corresponding to the invoked state at the user interface based on the logical specification in the view identifier.

9. The method of claim 8, wherein generating the view comprises:
  determining a channel for the user interface;
  selecting a channel adapter corresponding to the channel; and
  providing the logical specification to the channel adapter, wherein the channel adapter generates the corresponding view based on the logical specification.

10. The method of claim 8, wherein generating the view comprises:
  retrieving a map associating the logical specification of the corresponding view with a physical implementation of the view;
  determining the physical implementation of the view based on the map; and
  generating the physical implementation of the view at the user interface.

11. The method of claim 8, wherein:
  the user interface is a first user interface, the input is first input, the state is a first state, and the view identifier is a first view identifier; and
  the method further comprises:
    receiving second input from a second user interface;
    in response to the second input, invoking the process module in a second state comprising a second view identifier;
    receiving the second view identifier from the process module at the controller; and
    generating the corresponding view for the second state based on the logical specification in the second view identifier.

12. The method of claim 8, wherein generating the view is further based on a user profile associated with the user interface.

13. The method of claim 8, wherein invoking the process module comprises:
  determining a characteristic of the user; and
  invoking one of a plurality of process modules based on the characteristic of the user.

14. The method of claim 13, wherein:
  the characteristic is an experience level of the user; and
  the characteristic is determined based on a user profile.

15. A system for generating a view at a user interface, comprising:
  a user interface operable to receive input;
  a controller in communication with a user interface and operable to:
    receive a request from the user interface;
    identify a process module associated with the request; and
    route the request to the process module to invoke the process module, the process module associated with a business process in response to the input, the process module being invoked in one of a plurality of states, each state comprising logic defining a portion of the business process and comprising an identifier of a view to be presented to the user corresponding to the state, the view identifier comprising a logical specification of the corresponding view, the process module operable to provide the view identifier corresponding to the invoked state;
  the controller operable to:
    receive the view identifier from the process module; and
    generate the view corresponding to the invoked state at the user interface based on the logical specification in the view identifier.

16. The system of claim 15, wherein the view generator is further operable to:
  determine a channel for the user interface;

select a channel adapter corresponding to the channel; and provide the logical specification to the channel adapter, wherein the channel adapter generates the corresponding view based on the logical specification.

17. The system of claim 15, wherein:

the user interface is a first user interface, the input is first input, the state is a first state, and the view identifier is a first view identifier;

the system further comprises:
- a second user interface operable to receive second input; and
- a second view generator;

the controller is further operable to invoke the process module in a second state comprising a second view identifier in response to the second input; and the second view generator is operable to receive the second view identifier from the process module at the controller and to generate the corresponding view for the second state based on the logical specification in the second view identifier.

18. The system of claim 15, wherein the controller is further operable to:

determine a characteristic of the user; and invoke one of a plurality of process modules based on the characteristic of the user.

19. The system of claim 18, wherein:

the characteristic is an experience level of the user; and the characteristic is determined based on a user profile.

20. The system of claim 15, wherein the view generator is further operable to:

retrieve a map associating the logical specification of the corresponding view with a physical implementation of the view; and determine the physical implementation of the view based on the map.

* * * * *